(12) United States Patent
Noguchi et al.

(10) Patent No.: US 11,256,247 B2
(45) Date of Patent: Feb. 22, 2022

(54) VEHICLE CONTROL SYSTEM

(71) Applicant: HONDA MOTOR CO., LTD., Tokyo (JP)

(72) Inventors: Junpei Noguchi, Wako (JP); Miki Tsujino, Wako (JP); Masahiro Kowada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 132 days.

(21) Appl. No.: 16/829,380

(22) Filed: Mar. 25, 2020

(65) Prior Publication Data
US 2020/0310412 A1  Oct. 1, 2020

(30) Foreign Application Priority Data
Mar. 29, 2019 (JP) .............................. JP2019-067729

(51) Int. Cl.
*G05D 1/00* (2006.01)
*G06T 7/70* (2017.01)
*G05D 1/02* (2020.01)

(52) U.S. Cl.
CPC ......... *G05D 1/0016* (2013.01); *G05D 1/0033* (2013.01); *G05D 1/0212* (2013.01); *G06T 7/70* (2017.01); *G05D 2201/0213* (2013.01); *G06T 2207/30252* (2013.01)

(58) Field of Classification Search
None
See application file for complete search history.

(56) References Cited

U.S. PATENT DOCUMENTS

| 8,958,929 | B2 | 2/2015 | Okamura et al. |
| 2014/0058587 | A1* | 2/2014 | Leinfelder ......... B62D 15/0285 |
| | | | 701/2 |
| 2018/0056989 | A1* | 3/2018 | Donald ................ G05D 1/0016 |

FOREIGN PATENT DOCUMENTS

JP  5704178 B2  4/2015

* cited by examiner

*Primary Examiner* — Jonathan M Dager
*Assistant Examiner* — Garrett F Evans
(74) *Attorney, Agent, or Firm* — Armstrong Teasdale LLP

(57) ABSTRACT

A vehicle control system includes: a terminal including an input/output unit configured to accept an operation input by a user and to display a notification to the user and an operator monitoring unit configured to monitor the user performing the operation input; and a control device configured to perform remote parking processing to move and park a vehicle in response to the operation input by the user, wherein, in the remote parking processing, the control device is configured to obtain a direction of a sightline of the user based on information obtained by the operator monitoring unit, and prohibit a movement of the vehicle in a case where the control device determines that the sightline of the user is directed to the terminal.

5 Claims, 10 Drawing Sheets

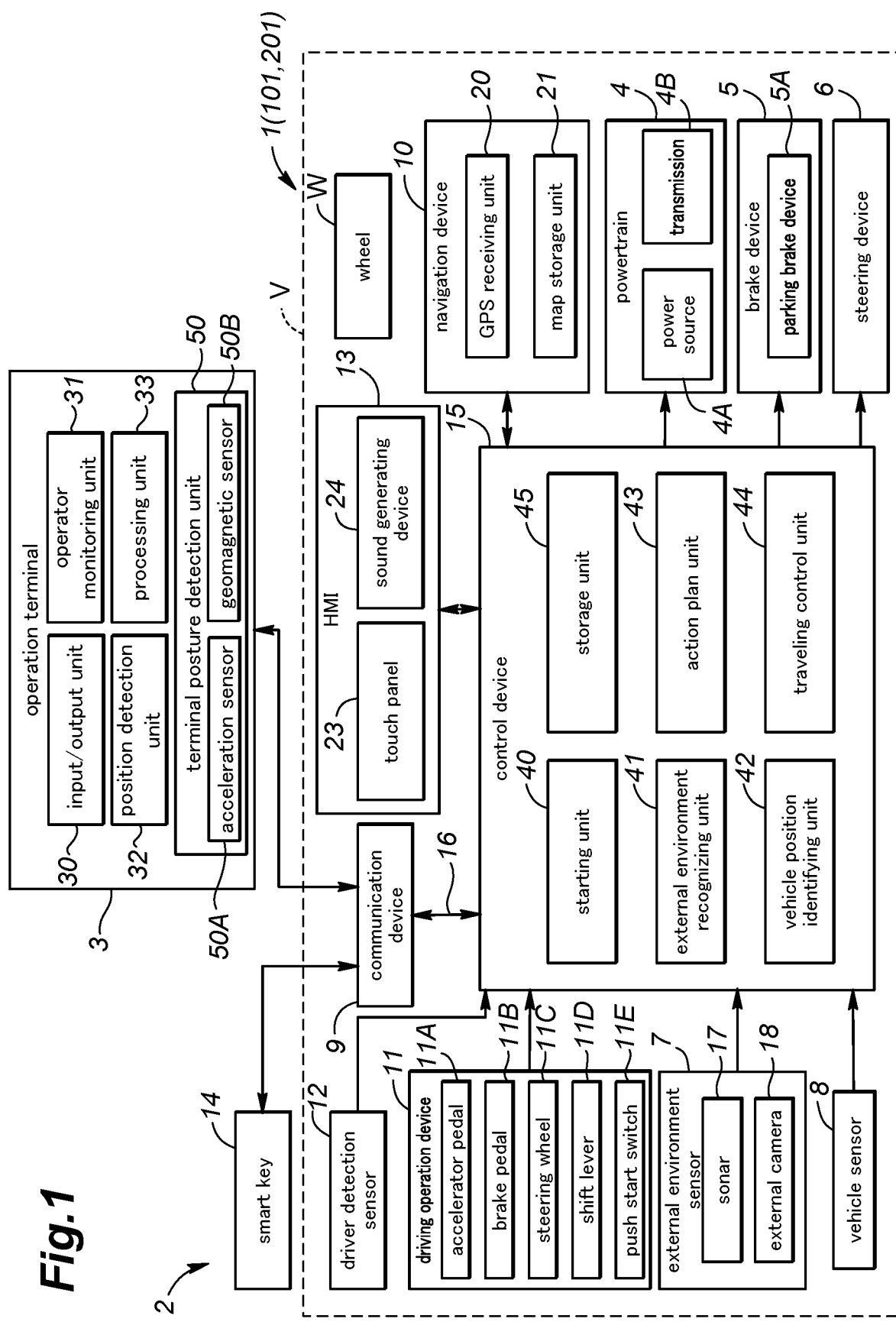

rear ← → front rear ← → front

VEHICLE CONTROL SYSTEM

TECHNICAL FIELD

The present invention relates to a vehicle control system for parking a vehicle by a remote operation from a terminal.

BACKGROUND ART

A known vehicle control device permits a user to park a vehicle by a remote operation of the vehicle from a wireless terminal (for example, Japanese Patent No. 5704178B2). The wireless terminal is provided with a remote operation button, and the vehicle moves along a preset trajectory while the user is pressing the remote operation button.

When a user moves a vehicle by a remote operation, it is desirable that the user monitor a movement of the vehicle. However, in the above vehicle control device, the user watches the remote operation button while pressing it, and therefore, the user may not be able to monitor the movement of the vehicle.

SUMMARY OF THE INVENTION

In view of such a problem of the prior art, a primary object of the present invention is to provide a vehicle control system that can control and park a vehicle by a remote operation from a terminal and can urge a user to monitor the vehicle when the vehicle moves.

To achieve such an object, one embodiment of the present invention provides a vehicle control system (1, 101, 201) that includes: a terminal (3) including an input/output unit (30) configured to accept an operation input by a user and to display a notification to the user and an operator monitoring unit (31) configured to monitor the user performing the operation input; and a control device (15) configured to perform remote parking processing to move and park a vehicle (V) in response to the operation input by the user, wherein, in the remote parking processing, the control device is configured to obtain a direction (v) of a sightline of the user based on information obtained by the operator monitoring unit, and prohibit a movement of the vehicle in a case where the control device determines that the sightline of the user is directed to the terminal.

According to this arrangement, when the user watches the terminal and does not monitor the vehicle, the movement of the vehicle is prohibited. Thereby, it is possible to urge the user to monitor the vehicle without watching the terminal when the vehicle moves.

Preferably, in the remote parking processing, the control device is configured to prohibit the movement of the vehicle in the case where the control device determines that the sightline of the user is directed to the terminal when the operation input is accepted, and permit the movement of the vehicle in a case where the control device determines that the sightline of the user is directed to the vehicle within a prescribed acceptance period after the operation input is accepted.

According to this arrangement, when the user starts to monitor the vehicle within the prescribed acceptance period after the user performs the operation input while watching the terminal, the vehicle moves. Thereby, the user can move the vehicle without performing the operation input while simultaneously monitoring the vehicle. Therefore, the vehicle control system can be more convenient.

Preferably, in the remote parking processing, the control device is configured to make the input/output unit display a notification that urges the user to direct the sightline to the vehicle in a case where the control device does not determine that the sightline of the user is directed to the vehicle within a prescribed notification period shorter than the acceptance period after the operation input is accepted.

According to this arrangement, when the user starts to monitor the vehicle according to the notification, the vehicle moves. Thereby, the user can easily understand that the user should monitor the vehicle, so that the vehicle control system can be more convenient.

Preferably, in the remote parking processing, the control device is configured to determine that the sightline of the user is directed to the vehicle in a case where the sightline of the user is not directed to the terminal.

According to this arrangement, it is possible to easily determine whether the user monitors the vehicle by using a simple configuration.

Preferably, the operator monitoring unit is configured to capture an image of a face of the user performing the operation input, and the control device is configured to obtain the direction of the sightline of the user based on the image captured by the operator monitoring unit.

According to this arrangement, by obtaining the direction of the sightline of the user based on the image captured by the operator monitoring unit of the terminal, it is possible to obtain the direction of the sightline of the user based on an image captured at a position closer to the user, compared with a case where the direction of the sightline of the user is obtained based on an image captured from the vehicle. Thereby, it is possible to more reliably obtain the direction of the sightline of the user.

Preferably, the operator monitoring unit is configured to capture an image of a face of the user performing the operation input, the terminal includes a first position identifying unit (32) configured to identify a position of the terminal and the control device includes a second position identifying unit (42) configured to identify a position of the vehicle, and the control device is configured to obtain the direction (v) of the sightline of the user based on the image captured by the operator monitoring unit, obtain a direction (p) from the terminal to the vehicle based on the position of the terminal and the position of the vehicle, and determine that the sightline of the user is directed to the vehicle in a case where an angle between the direction of the sightline of the user and the direction from the terminal to the vehicle is equal to or less than a prescribed value.

According to this arrangement, it is possible to easily determine whether the user monitors the vehicle by using a simple configuration.

Another embodiment of the present invention provides a vehicle control system (1, 101, 201) that includes: a terminal (3) including an input/output unit (30) configured to accept an operation input by a user and to display a notification to the user and an operator monitoring unit (31) configured to monitor the user performing the operation input; and a control device (15) configured to perform remote parking processing to move and park a vehicle (V) in response to the operation input by the user, wherein, in the remote parking processing, the control device is configured to obtain a direction (v) of a sightline of the user based on information obtained by the operator monitoring unit, and prohibit a movement of the vehicle in a case where the control device determines that the sightline of the user is not directed to the vehicle.

Thus, according to one embodiment of the present invention, it is possible to provide a vehicle control system that can control and park a vehicle by a remote operation from a terminal and can urge a user to monitor the vehicle when the vehicle moves.

BRIEF DESCRIPTION OF THE DRAWINGS

FIG. 1 is a functional block diagram of a vehicle control system according to a first embodiment of the present invention;

DESCRIPTION OF THE PREFERRED EMBODIMENT(S)

Figure 2A:
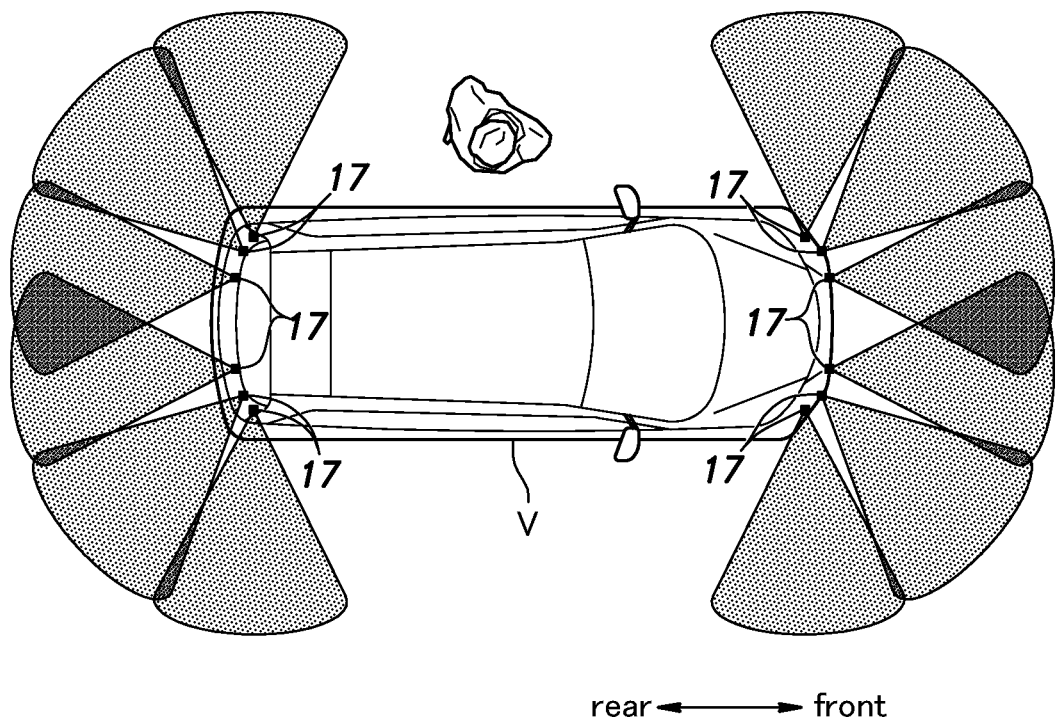
FIG. 2A is a schematic plan view showing sonars provided in a vehicle and detection areas of the sonars.

In the following, a vehicle control system according to embodiments of the present invention is described with reference to the drawings.

First Embodiment

First, a vehicle control system 1 according to a first embodiment is described. As shown in FIG. 1, the vehicle control system 1 includes a vehicle system 2 and at least one operation terminal 3. The vehicle system 2 includes a powertrain 4, a brake device 5, a steering device 6, an external environment sensor 7, a vehicle sensor 8, a communication device 9, a navigation device 10, a driving operation device 11, a driver detection sensor 12, an HMI 13, a smart key 14, and a control device 15. The above components of the vehicle system 2 are connected to each other by communication means such as a controller area network 16 (CAN) so that a signal can be transmitted between the above components. The above components of the vehicle system 2 except the smart key 14 are mounted to the vehicle V.

The powertrain 4 is a device that applies a driving force to the vehicle V. The powertrain 4 includes a power source 4A and a transmission 4B, for example. The power source 4A includes at least one of an internal combustion engine such as a gasoline engine and a diesel engine and an electric motor. The brake device 5 is a device that applies a brake force to the vehicle V. For example, the brake device 5 includes a brake caliper that presses a brake pad against a brake rotor and an electric cylinder that supplies an oil pressure to the brake caliper. The brake device 5 includes a parking brake device 5A that restricts rotations of wheels W via wire cables. The steering device 6 is a device for changing a steering angle of the wheels W. For example, the steering device 6 includes a rack-and-pinion mechanism that steers (turns) the wheels W and an electric motor that drives the rack-and-pinion mechanism. The powertrain 4, the brake device 5, and the steering device 6 are controlled by the control device 15.

The external environment sensor 7 is a sensor that detects electromagnetic waves, sound waves, and the like from the periphery of the vehicle V to detect an object outside the vehicle V. The external environment sensor 7 includes sonars 17 and external cameras 18. The external environment sensor 7 may further include a millimeter wave radar or a laser lidar. The external environment sensor 7 outputs a detection result to the control device 15.

Each sonar 17 consists of a so-called ultrasonic sensor. Each sonar 17 emits ultrasonic waves around the vehicle V and captures the ultrasonic waves reflected by the object to detect a position (distance and direction) of the object. As shown in FIG. 2A, a plurality of sonars 17 are provided at a rear part and a front part of the vehicle V, respectively. In the present embodiment, two pairs of sonars 17 are provided on left and right sides of a rear bumper, two pairs of sonars 17 are provided on left and right sides of a front bumper, and one pair of sonars 17 are provided at front and rear ends of each of left and right faces of the vehicle V. That is, the vehicle V is provided with six pairs of sonars in total. In FIG. 2A, detection areas of the sonars 17 are colored. The sonars 17 provided on the rear bumper mainly detect a position of an object behind the vehicle V. The sonars 17 provided on the front bumper mainly detect a position of an object in front of the vehicle V. The sonars 17 provided at the front ends of the left and right faces of the vehicle V detect a position of an object on left and right outsides of the front end of the vehicle V, respectively. The sonars 17 provided at the rear ends of the left and right faces of the vehicle V detect a position of an object on left and right outsides of the rear end of the vehicle V, respectively.

Figure 2B:
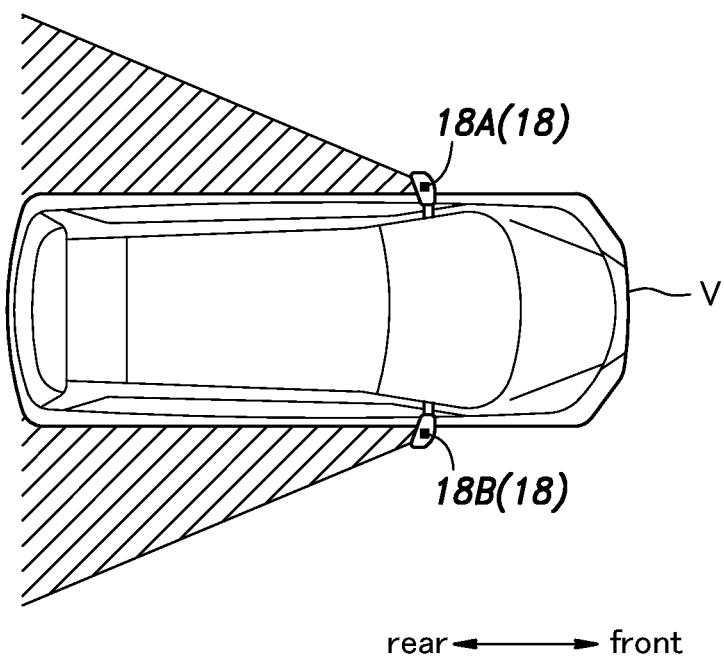
FIG. 2B is a schematic plan view showing door mirror cameras provided in the vehicle and image capturing areas of the door mirror cameras.

The external cameras 18 are devices that capture images around the vehicle V. Each external camera 18 consists of a digital camera using a solid imaging element such as a CCD or a CMOS, for example. The external cameras 18 include a front camera that captures an image of the front of the vehicle V and a rear camera that captures an image of the rear of the vehicle V. As shown in FIG. 2B, the external cameras 18 include a pair of left and right door mirror cameras 18A, 18B that are provided in the vicinity of the door mirrors of the vehicle V to capture images behind left and right sides of the vehicle V. In FIG. 2B, image capturing areas (detection areas) of the door mirror cameras 18A, 18B are hatched. The external cameras 18 may include a pair of left and right pillar cameras provided on center pillars (B pillars) of the vehicle V to capture images of left and right outsides of the vehicle V.

The vehicle sensor 8 includes a vehicle speed sensor that detects the speed of the vehicle V, an acceleration sensor that detects the acceleration of the vehicle V, a yaw rate sensor that detects the angular velocity around a vertical axis of the vehicle V, and a direction sensor that detects the direction of the vehicle V. For example, the yaw rate sensor consists of a gyro sensor.

The communication device 9 mediates (relays) wireless communication between the control device 15 and the operation terminal 3. Thereby, the control device 15 can communicate with the operation terminal 3 carried by the user via the communication device 9. The communication device 9 may utilize a known communication method such as infrared communication or Bluetooth (registered trademark), for example.

The navigation device 10 is a device that obtains a current position of the vehicle V and provides route guidance to a destination and the like. The navigation device 10 includes a GPS receiving unit 20 and a map storage unit 21. The GPS receiving unit 20 identifies a position (latitude and longitude) of the vehicle V based on a signal received from an artificial satellite (positioning satellite). The map storage unit 21 consists of a known storage device such as a flash memory or a hard disk, and stores map information.

The driving operation device 11 is provided in a vehicle cabin of the vehicle V and accepts an input operation (driving operation) by the driver (user) to control the vehicle V. The driving operation device 11 includes an accelerator pedal 11A, a brake pedal 11B, a steering wheel 11C, a shift lever 11D, and a push start switch 11E (engine start button). The push start switch 11E accepts a starting operation of the vehicle V (input operation to start operation of the vehicle V) by the driver. The driving operation device 11 may further include an element to activate the parking brake device 5A. The driving operation device 11 includes a sensor that detects an operation amount of the input operation, and outputs a signal indicating the operation amount of the input operation to the control device 15.

The driver detection sensor 12 is a sensor to detect that the driver (user) is sitting on a driver's seat. For example, the driver detection sensor 12 consists of a seat sensor provided on a seat surface of the driver's seat. The seat sensor may consist of a capacitance-type sensor to detect a change in capacitance, or may consist of a membrane-type switch that is turned on when the driver sits on the driver's seat. Alternatively, the driver detection sensor 12 may consist of an indoor camera that captures an image of the driver sitting on the driver's seat. Alternatively, the driver detection sensor 12 may consist of a seat belt sensor to detect that the driver fastens a seat belt of the driver's seat based on information as to whether a tongue of the seat belt is inserted into a buckle thereof. The driver detection sensor 12 outputs a detection result to the control device 15.

The HMI 13 notifies the user of various kinds of information by a display or a voice, and accepts an input operation by the user. For example, the HMI 13 includes a touch panel 23 that accepts the input operation by the user and a sound generating device 24 such as a buzzer and a speaker. The touch panel 23 includes a liquid crystal display, an organic EL display, and the like.

The control device 15 consists of an electronic control device (ECU) that includes a CPU, a nonvolatile memory such as a ROM, a volatile memory such as a RAM, and the like. The CPU executes operation processing according to a program so that the control device 15 executes various types of vehicle control. The control device 15 may be composed of one piece of hardware, or may be composed of a unit including plural pieces of hardware. Further, the functions of the control device 15 may be at least partially executed by hardware such as an LSI, an ASIC, and an FPGA, or may be executed by a combination of software and hardware.

The smart key 14 (FOB key) is a known wireless terminal that can be carried by the user. The smart key 14 can communicate with the control device 15 from outside the vehicle V via the communication device 9. The smart key 14 includes a button to accept input by the user. The user can release a door lock and start the operation of the vehicle V by operating the button of the smart key 14.

The operation terminal 3 consists of a wireless terminal that can be carried by the user, and can communicate with the control device 15 from outside the vehicle V via the communication device 9. In the present embodiment, the operation terminal 3 consists of a smartphone. A prescribed application is installed on the operation terminal 3 in advance so that the operation terminal 3 can communicate with the control device 15. The operation terminal 3 is provided with a terminal ID, which is a prescribed numerical value to identify the operation terminal 3.

As shown in FIG. 1, the operation terminal 3 includes an input/output unit 30, an operator monitoring unit 31, a position detection unit 32, and a processing unit 33.

The input/output unit 30 provides information to the user operating the operation terminal 3, and accepts input by the user operating the operation terminal 3. The input/output unit 30 consists of a touch panel, for example. When the input/output unit 30 accepts the input by the user, the input/output unit 30 outputs a signal corresponding to the input to the processing unit 33.

The operator monitoring unit 31 is a unit that captures an image of the user operating the operation terminal 3. The operator monitoring unit 31 consists of a digital camera using a solid imaging element such as a CMOS, for example. The operator monitoring unit 31 is provided at a position to capture an image of a face including eyes of the user performing the input to the input/output unit 30.

The position detection unit 32 obtains positional information of the operation terminal 3. The position detection unit 32 may obtain the positional information of the operation terminal 3 by receiving a signal from a geodetic satellite (GPS satellite), for example. Alternatively, the position detection unit 32 may obtain information about a position of the operation terminal 3 relative to the vehicle V by communicating with the control device 15 via the communication device 9. The position detection unit 32 outputs the obtained positional information of the operation terminal 3 to the processing unit 33.

The processing unit 33 sends the control device 15 the signal from the input/output unit 30, the image of the user captured by the operator monitoring unit 31, and the positional information of the operation terminal 3 obtained by the position detection unit 32. Also, when the processing unit 33 receives a signal from the control device 15, the processing unit 33 processes the signal from the control device 15 and makes the input/output unit 30 provide information to the user operating the operation terminal 3. The input/output unit 30 may provide the information to the user by displaying the information thereon, for example.

The control device 15 can start the operation of the vehicle V (namely, the driving of the powertrain 4) based on a signal from the operation terminal 3. Also, the control device 15 can move the vehicle V to a prescribed position and park the vehicle V there based on a signal from the operation terminal 3. To control the vehicle V at this time, the control device 15 at least includes a starting unit 40, an external environment recognizing unit 41, a vehicle position identifying unit 42, an action plan unit 43, a traveling control unit 44, and a storage unit 45.

The starting unit 40 executes authentication of the smart key 14 based on a signal from the push start switch 11E included in the driving operation device 11. Also, the starting unit 40 determines whether the smart key 14 is located in the vehicle V. In a case where the authentication of the smart key 14 succeeds and the starting unit 40 determines that the smart key 14 is located inside the vehicle V, the starting unit 40 starts the driving of the powertrain 4

(namely, the starting unit 40 starts the operation of the vehicle V). Also, in a case where the control device 15 receives a signal that instructs a start of the operation of the vehicle V from the operation terminal 3, the starting unit 40 executes authentication of the operation terminal 3. In a case where the authentication of the operation terminal 3 succeeds, the starting unit 40 starts the driving of the powertrain 4 (namely, the starting unit 40 starts the operation of the vehicle V). In a case where the powertrain 4 includes an internal combustion engine, the starting unit 40 turns on an ignition device when the starting unit 40 starts the driving of the powertrain 4.

The external environment recognizing unit 41 recognizes an obstacle (for example, a parked vehicle or a wall) located around the vehicle V based on the detection result of the external environment sensor 7, and thereby obtains information about the obstacle. Further, the external environment recognizing unit 41 analyzes an image captured by the external cameras 18 based on a known image analysis method such as pattern matching, and thereby determines whether the obstacle is present and obtains the size of the obstacle in a case where the obstacle is present. Further, the external environment recognizing unit 41 may compute a distance to the obstacle based on signals from the sonars 17 to obtain the position of the obstacle.

The vehicle position identifying unit 42 identifies the position of the vehicle V based on a signal from the GPS receiving unit 20 of the navigation device 10. Further, the vehicle position identifying unit 42 may obtain the vehicle speed and yaw rate of the vehicle V from the vehicle sensor 8, in addition to the signal from the GPS receiving unit 20, to identify the position and posture of the vehicle V by so-called inertial navigation.

The external environment recognizing unit 41 analyzes the detection result of the external environment sensor 7 (more specifically, the images captured by the external cameras 18) based on a known image analysis method such as pattern matching, and thereby recognizes a position of a white line on a road surface of a parking area, for example.

The traveling control unit 44 controls the powertrain 4, the brake device 5, and the steering device 6 based on a traveling control instruction from the action plan unit 43 to make the vehicle V travel.

The storage unit 45 consists of a RAM and the like, and stores information necessary for executing processing of the action plan unit 43 and the traveling control unit 44.

When the HMI 13 or the operation terminal 3 accepts an input by the user, the action plan unit 43 computes a trajectory (traveling route) of the vehicle V and outputs the traveling control instruction to the traveling control unit 44, if necessary.

Figure 3:
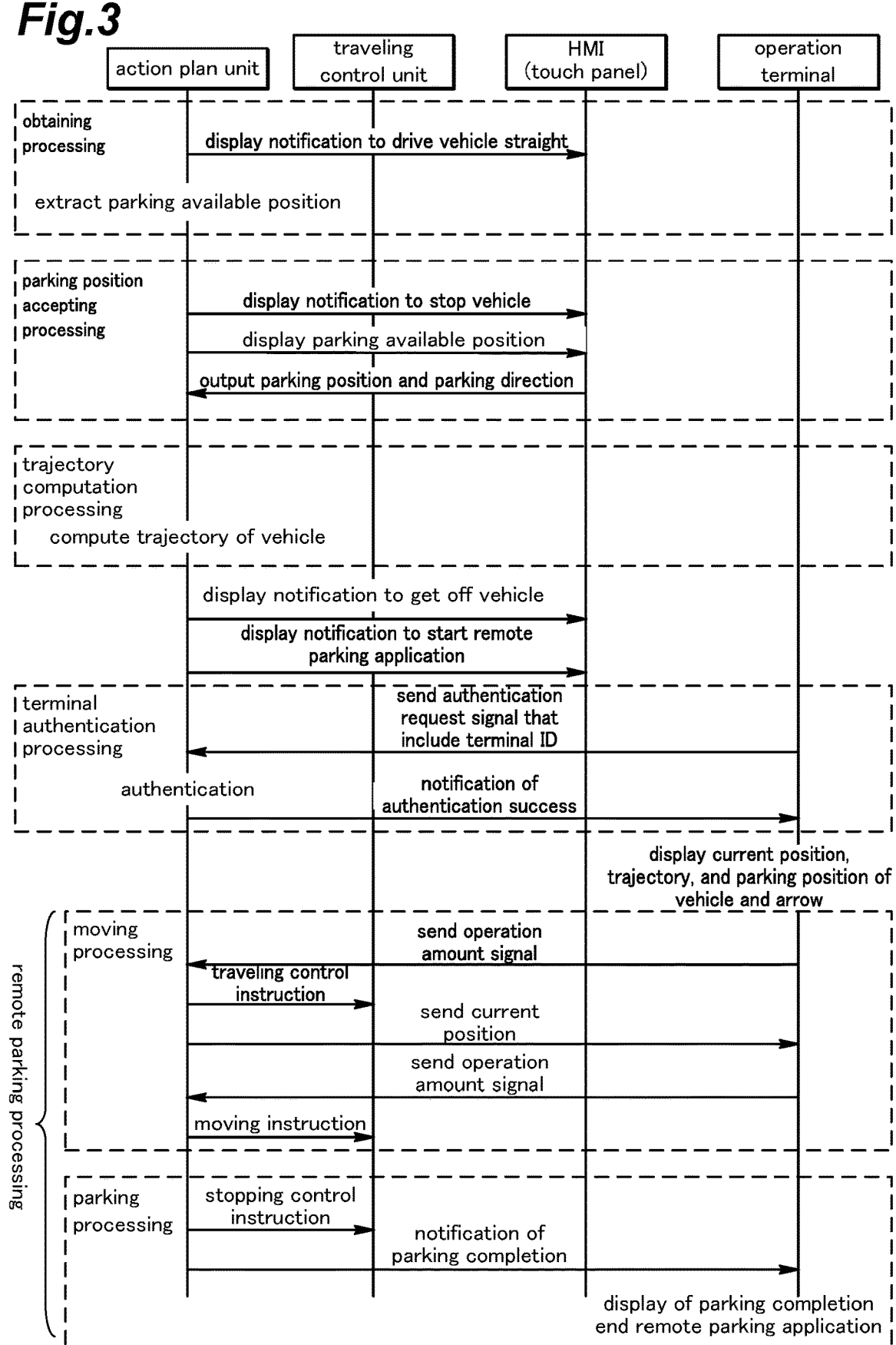
FIG. 3 is a sequence diagram of parking assist processing.

After the vehicle V has stopped, the action plan unit 43 executes parking assist processing, when the user performs an input corresponding to desire for parking assistance by a remote operation. In the following, the parking assist processing will be described with reference to a sequence diagram of FIG. 3.

First, the action plan unit 43 executes obtaining processing to obtain at least one space to park the vehicle V (hereinafter referred to as "parking available position"). Specifically, the action plan unit 43 makes the touch panel 23 of the HMI 13 display a notification that instructs the driver to drive the vehicle V straight. While the driver is driving the vehicle V straight, the action plan unit 43 obtains the position and size of the obstacle and the position of the white line on the road surface based on the signal from the external environment sensor 7. The action plan unit 43 extracts the at least one parking available position based on the position and size of the obstacle and the position of the white line.

Next, the action plan unit 43 executes parking position accepting processing to accept a selection of a position to park the vehicle V (hereinafter referred to as "parking position") from the at least one parking available position. More specifically, the action plan unit 43 makes the touch panel 23 display a notification that instructs the user to stop the vehicle V, in a case where the action plan unit 43 extracts the at least one parking available position in the above obtaining processing. At this time, the action plan unit 43 may make the touch panel 23 also display a notification that instructs the user to change a position of the shift lever 11D to the parking position after the vehicle V has stopped.

Next, the action plan unit 43 makes the touch panel 23 display the current position of the vehicle V and the at least one parking available position. At this time, the action plan unit 43 may make the touch panel 23 display the current position of the vehicle V and the at least one parking available position on the image obtained by the external cameras 18. Thereafter, the action plan unit 43 makes the touch panel 23 display a notification that instructs the user to select the parking position from the at least one parking available position. When the user inputs a desired parking position to the touch panel 23, the touch panel 23 outputs a signal corresponding to the inputted parking position to the action plan unit 43. At this time, the action plan unit 43 may identify the desired parking position based on a position where the user touches the touch panel 23. At this time, the action plan unit 43 makes the touch panel 23 display a button for the user to select a parking direction (a forward parking direction or a backward parking direction). At this time, the action plan unit 43 may simply compute a pair of routes from the current position of the vehicle V to the parking position such that each route corresponds to the forward parking direction or the backward parking direction, and may make the touch panel 23 display the pair of routes. In such a case, the touch panel 23 may permit the user to select the parking direction by touching one of the pair of routes, and may output the selection result (namely, selected parking direction) to the action plan unit 43.

Next, when the action plan unit 43 receives the parking position inputted by the user from the touch panel 23, the action plan unit 43 executes trajectory computation processing to compute a trajectory of the vehicle V from the current position to the parking position. In a case where the user performs the input to select the parking direction, the action plan unit 43 may compute the trajectory of the vehicle V based on not only the current position and the parking position but also the parking direction selected by the user.

When the computation of the trajectory of the vehicle V is completed, the action plan unit 43 makes the touch panel 23 display a notification that urges the user to get off the vehicle V and a notification that instructs the user to start dedicated application software for the remote parking processing (hereinafter referred to as "remote parking application") in the operation terminal 3. According to these notifications, the user gets off the vehicle V, and then starts the remote parking application in the operation terminal 3.

Thereafter, the input/output unit 30 of the operation terminal 3 displays an input button to connect the operation terminal 3 to the vehicle V and to start the authentication of the operation terminal 3. When the user operates (for example, touches or pushes) the input button, the operation terminal 3 is connected to the vehicle V and the action plan unit 43 executes terminal authentication processing to execute the authentication of the operation terminal 3 connected to the vehicle V. In the terminal authentication processing, the operation terminal 3 sends the action plan unit 43 an authentication request signal that includes the terminal ID of the operation terminal 3, and the action plan unit 43 executes the authentication (determination) of the operation terminal 3 based on the terminal ID of the operation terminal 3. When the action plan unit 43 succeeds in the authentication of the operation terminal 3, the action plan unit 43 sends a signal to notify authentication success to the operation terminal 3, and then the input/output unit 30 of the operation terminal 3 displays the current position, trajectory, and parking position of the vehicle V and a vertical arrow. Thereby, the user can instruct the action plan unit 43 to execute the remote parking processing by performing the input to the input/output unit 30 of the operation terminal 3. The remote parking processing includes moving processing to move the vehicle V from the current position to the parking position and parking processing to park the vehicle V at the parking position.

When the user swipes (operates) the vertical arrow displayed on the input/output unit 30 of the operation terminal 3, the operation terminal 3 sends an operation amount signal corresponding to a swipe amount (operation amount) of the vertical arrow to the action plan unit 43. The action plan unit 43 converts the operation amount signal into a moving amount of the vehicle V and executes the moving processing to move the vehicle V along the trajectory by the computed moving amount until the vehicle V reaches the parking position. In the moving processing, the action plan unit 43 sends the traveling control instruction to the traveling control unit 44, and sends the current position of the vehicle V to the operation terminal 3.

During this moving processing, the action plan unit 43 determines whether the vehicle V has reached the parking position. When the action plan unit 43 determines that the vehicle V has reached the parking position, the action plan unit 43 executes the parking processing to park the vehicle V. In this parking process, the action plan unit 43 first sends a stopping control instruction to the traveling control unit 44 to activate the brake device 5. Thereafter, the action plan unit 43 activates the parking brake device 5A. When the parking processing is completed, the action plan unit 43 sends a notification of parking completion, which indicates that the parking processing has been completed, to the operation terminal 3.

When the operation terminal 3 receives the notification of parking completion, the input/output unit 30 of the operation terminal 3 displays a notification to indicate that the parking of the vehicle V has been completed, and the operation terminal 3 ends the remote parking application. Thereby, the parking assist processing is completed.

The vehicle control system 1 according to the present embodiment includes the operation terminal 3 and the control device 15 that executes the remote parking processing. In the remote parking processing, the control device 15 determines whether to permit the movement of the vehicle V based on a direction of a sightline of the user performing an operation input to the operation terminal 3.

The operation terminal 3 according to the present embodiment is a so-called smartphone. The input/output unit 30 according to the present embodiment is a so-called touch panel that accepts the operation input by the user and displays a notification to the user on a screen thereof.

As shown in FIG. 1, the operation terminal 3 according to the present embodiment includes a terminal posture detection unit 50. The terminal posture detection unit 50 is a sensor that obtains (detects) a posture of the operation terminal 3. In the present embodiment, the terminal posture detection unit 50 includes a three-axis acceleration sensor 50A and a three-axis geomagnetic sensor 50B.

Figure 5:
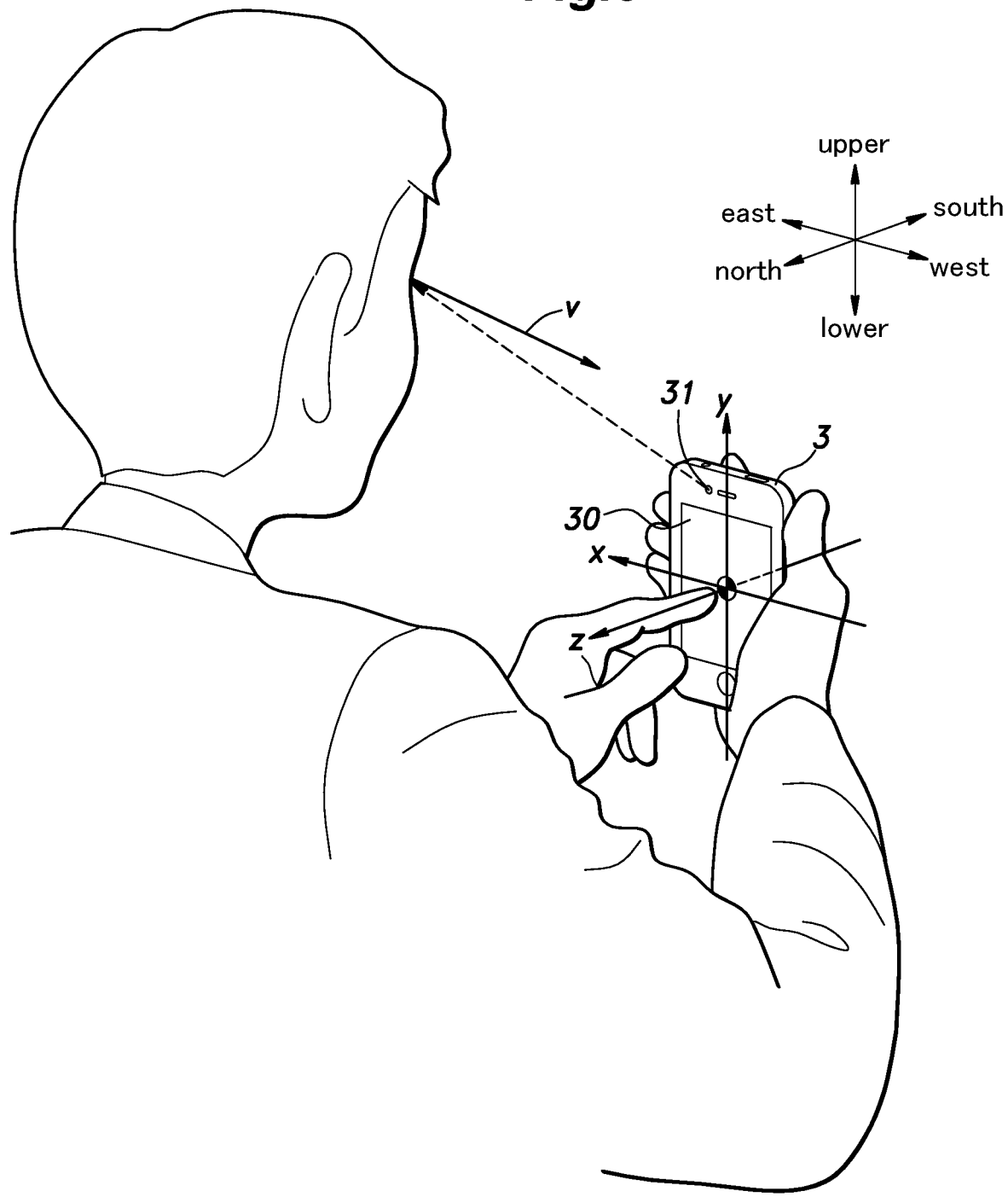
FIG. 5 is an explanatory diagram for explaining a method to detect a posture of an operation terminal.

The acceleration sensor 50A is a sensor that measures (obtains) the acceleration of the vehicle V. In the present embodiment, the acceleration sensor 50A consists of a capacitance-type MEMS sensor that measures the acceleration of the vehicle V based on a change in capacitance. Alternatively, the acceleration sensor 50A may consist of a piezoresistive MEMS sensor. The acceleration sensor 50A obtains acceleration in three axis directions orthogonal to each other. In the present embodiment, as shown in FIG. 5, the acceleration sensor 50A obtains acceleration in an x-axis direction and a y-axis direction parallel to the screen of the input/output unit 30 and a z-axis direction orthogonal to the screen of the input/output unit 30. A positive direction of the y-axis direction is directed upward with respect to the screen of the input/output unit 30. The z-axis crosses the screen of the input/output unit 30 at right angles such that a positive direction of the z-axis direction approaches the user watching the screen of the input/output unit 30. The processing unit 33 can obtain a direction of the gravitational acceleration based on the direction of the acceleration obtained by the acceleration sensor 50A.

The geomagnetic sensor 50B is a sensor that measures (detects) a magnetic field. In the present embodiment, the geomagnetic sensor 50B includes a Hall element that measures the magnetic field by using the Hall effect. For example, the geomagnetic sensor 50B may consist of a magnetoresistance effect sensor or a magnetic impedance sensor. The processing unit 33 can obtain the north direction based on the direction of the magnetic field obtained by the geomagnetic sensor 50B.

The processing unit 33 obtains the posture of the operation terminal 3 based on the acceleration obtained by the acceleration sensor 50A and the magnetic field obtained by the geomagnetic sensor 50B. Specifically, the processing unit 33 obtains an inclination of the screen of the input/output unit 30 with respect to the vertical downward direction (the direction of the gravitational acceleration) based on the direction of the acceleration obtained by the acceleration sensor 50A. Next, the processing unit 33 obtains the direction of the screen of the input/output unit 30 with respect to the north direction based on the north direction obtained by using the geomagnetic sensor 50B. Thereby, the processing unit 33 obtains the posture of the operation terminal 3 by using the inclination and direction of the screen of the input/output unit 30.

For example, there may be a case where the acceleration in the x-axis direction and the z-axis direction obtained by the acceleration sensor 50A is zero, a negative acceleration in the y-axis direction is obtained by the acceleration sensor 50A, the magnetic fields in the x-axis direction and the y-axis direction obtained by the geomagnetic sensor 50B are zero, and a negative magnetic field in the z-axis direction is obtained by the geomagnetic sensor 50B. In such a case, as shown in FIG. 5, the processing unit 33 determines that the operation terminal 3 is in a posture to locate the screen of the input/output unit 30 (the touch panel) along the vertical direction and to direct the screen of the input/output unit 30 north.

In the present embodiment, the processing unit 33 obtains a distance between the operation terminal 3 and the communication device 9 and the direction of the operation terminal 3 viewed from the communication device 9 by communicating with the communication device 9. In the present embodiment, the processing unit 33 communicates with the communication device 9 by using Bluetooth, and obtains an intensity of an electric field of a signal from the communication device 9. The processing unit 33 estimates the distance between the operation terminal 3 and the communication device 9 based on an attenuation amount of the intensity of the electric field thereof. In the present embodiment, the operation terminal 3 includes an array antenna for receiving a signal from the communication device 9, and receives the signal from the communication device 9 via the array antenna to detect an angle of arrival of the signal from the communication device 9 and to thereby obtain the direction of the operation terminal 3 from the communication device 9.

Figure 6B:
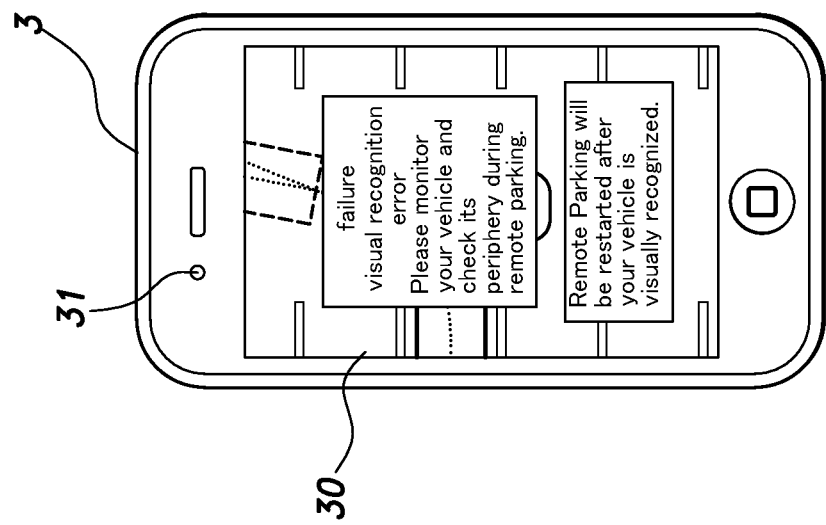
FIG. 6B is an explanatory diagram for explaining an alert screen.
Figure 6A:
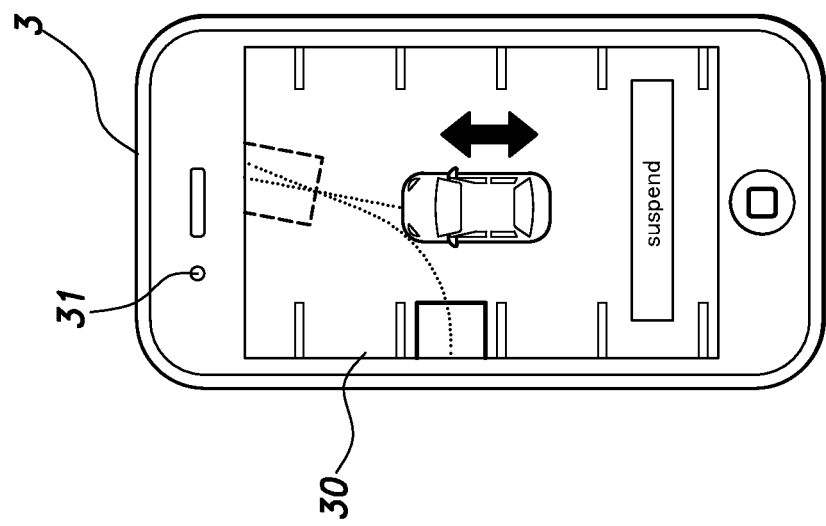
FIG. 6A is an explanatory diagram for explaining an input screen.

Further, in the present embodiment, when the remote parking processing is started after the operation terminal 3 receives the signal to notify the authentication success, the input/output unit 30 of the operation terminal 3 displays an input screen including the current position, trajectory, parking position of the vehicle V, the vertical arrow, and a suspension button (see FIG. 6A). When the user traces the screen of the input/output unit 30 of the operation terminal 3 along the displayed vertical arrow, an operation amount signal including information about the traced amount of the screen (namely, the operation amount of the input/output unit 30) is sent from the operation terminal 3 to the action plan unit 43. Also, when the user operates the suspension button, a signal indicating that the suspension button is operated is sent from the operation terminal 3 to the action plan unit 43.

Figure 4:
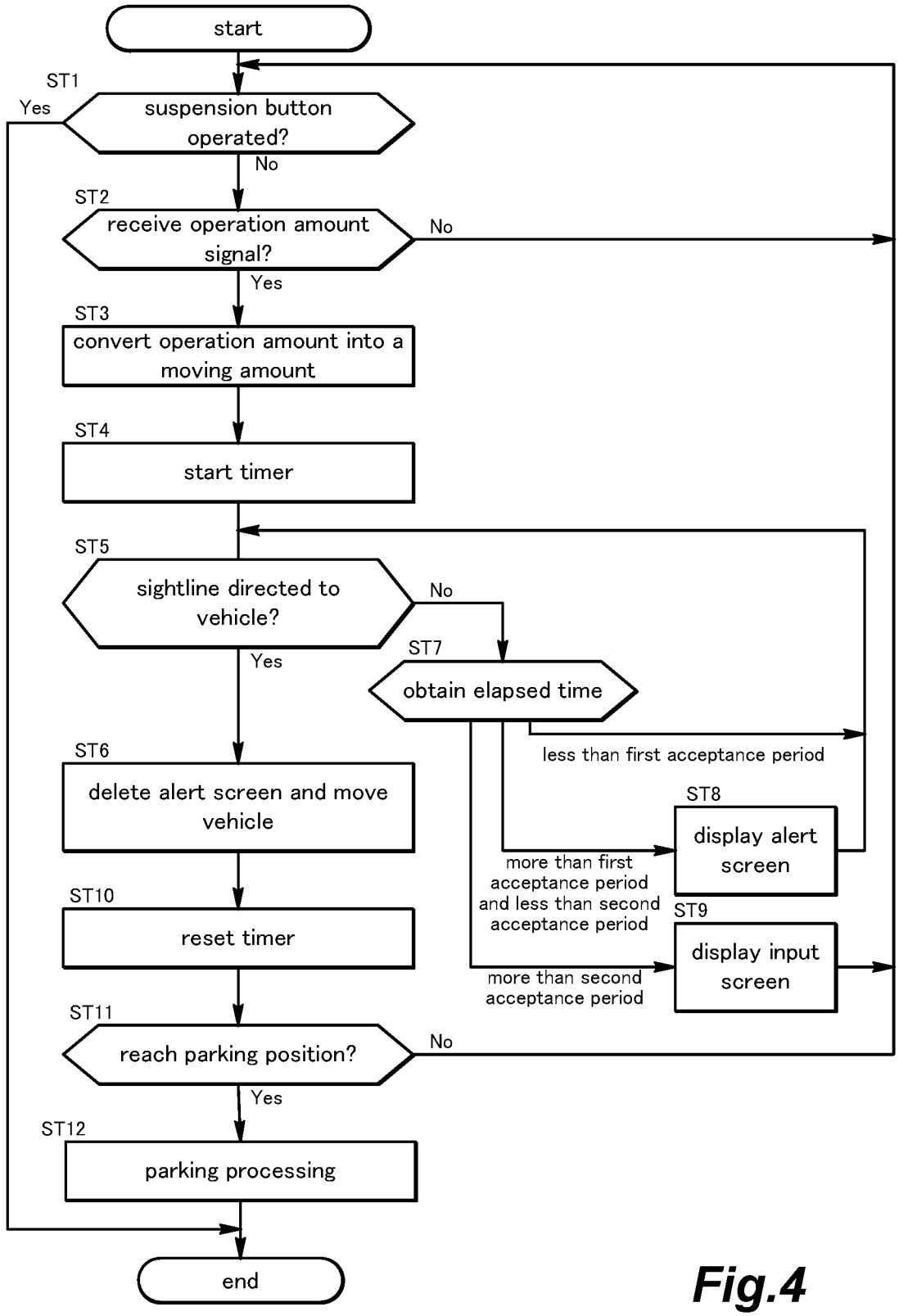
FIG. 4 is a flow chart of remote parking processing.

Next, the remote parking processing executed by the action plan unit 43 is described with reference to FIG. 4.

In step ST1 (the first step of the remote parking processing), the action plan unit 43 determines whether the action plan unit 43 receives a suspension signal from the processing unit 33 (namely, whether the suspension button is operated). The suspension signal is a signal indicating that the suspension button is operated by the user. In a case where the action plan unit 43 receives the suspension signal (namely, in a case where the suspension button is operated), the action plan unit 43 ends the remote parking processing (parking assist processing). Incidentally, when the processing unit 33 detects that the suspension button is operated by the user, the processing unit 33 may send the suspension signal to the action plan unit 43, and then may end the remote parking application. In a case where the action plan unit 43 does not receive the suspension signal (namely, in a case where the suspension button is not operated), the action plan unit 43 executes step ST2.

In step ST2, the action plan unit 43 determines whether the action plan unit 43 receives the operation amount signal from the operation terminal 3. In a case where the action plan unit 43 does not receive the operation amount signal, the action plan unit 43 returns to step ST1. In a case where the action plan unit 43 receives the operation amount signal, the action plan unit 43 executes step ST3.

In step ST3, the action plan unit 43 computes the operation amount of the input/output unit 30 based on the received operation amount signal. Thereafter, the action plan unit 43 converts the computed operation amount into a moving amount to move the vehicle V along the trajectory. The action plan unit 43 may convert the operation amount into the moving amount such that the moving amount is approximately proportional to the operation amount. When the conversion from the operation amount into the moving amount is completed, the action plan unit 43 executes step ST4.

The action plan unit 43 starts a timer in step ST4. Thereafter, the action plan unit 43 executes step ST5.

In step ST5, the action plan unit 43 sends a prescribed signal to the operation terminal 3 to make the processing unit 33 send an image (monitoring information) captured by the operator monitoring unit 31 to the action plan unit 43. Thereby, the action plan unit 43 obtains the image (hereinafter referred to as "user image") of the user performing the operation input on the screen of the input/output unit 30. Next, the action plan unit 43 obtains the direction of the sightline of the user (hereinafter referred to as "operator") performing the operation input on the screen of the input/output unit 30 by executing image analysis of the user image. In the present embodiment, the action plan unit 43 extracts the inner and outer corners of an eye (or eyes) and the iris portion including the pupil of the eye from the user image. The action plan unit 43 obtains the direction of the sightline of the operator viewed from the operation terminal 3 based on the positions of the inner and outer corners of the eye, the position of the pupil of the eye, the outline shape of the iris portion of the eye, and the like.

Next, the action plan unit 43 obtains the distance between the operation terminal 3 and the operator's eye and the direction of the operator's eye viewed from the operation terminal 3 by executing image analysis of the user image. At this time, the action plan unit 43 may obtain the size of the pupil on the user image and may compute the distance between the operation terminal 3 and the operator's eye based on the fact that the size of the pupil of a person is approximately 10 mm to 12 mm.

Thereafter, the action plan unit 43 sends a prescribed signal to the operation terminal 3 to make the processing unit 33 send the posture of the operation terminal 3 to the action plan unit 43. Thereby, the action plan unit 43 obtains the posture of the operation terminal 3. Furthermore, the action plan unit 43 communicates with the operation terminal 3 by using Bluetooth to make the processing unit 33 send the action plan unit 43 the distance between the operation terminal 3 and the communication device 9 and the direction of the operation terminal 3 viewed from the communication device 9. Thereby, the action plan unit 43 obtains the distance between the operation terminal 3 and the communication device 9 and the direction of the operation terminal 3 viewed from the communication device 9.

Figure 7:
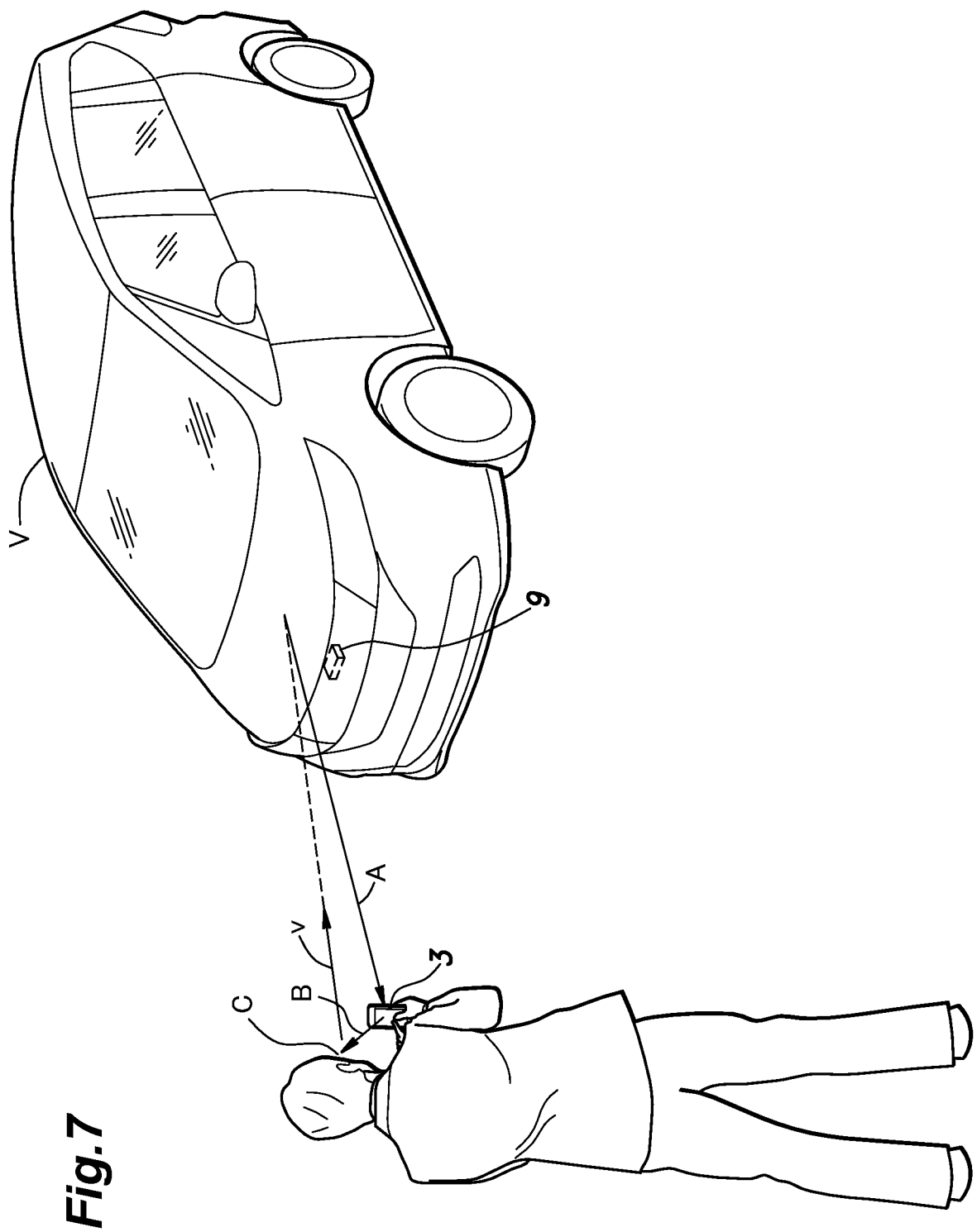
FIG. 7 is an explanatory diagram for explaining a method to obtain a direction of a sightline of an operator.

Next, as shown in FIG. 7, the action plan unit 43 computes the position of the operation terminal 3 (hereinafter referred to as "vector A") with respect to the vehicle V based on the distance between the operation terminal 3 and the communication device 9 and the direction of the operation terminal 3 viewed from the communication device 9. Thereafter, the action plan unit 43 computes the position of the operator's eye (hereinafter referred to as "vector B") with respect to the operation terminal 3 based on the distance between the operation terminal 3 and the operator's eye and the direction of the operator's eye viewed from the operation terminal 3. Thereafter, the action plan unit 43 obtains a position C of the operator's eye with respect to the vehicle V by adding the vector B to the vector A.

Next, the action plan unit 43 converts the direction of the sightline of the operator viewed from the operation terminal 3 into a direction v of the sightline of the operator with respect to the ground by using the posture of the operation terminal 3. Thereafter, the action plan unit 43 determines whether a line tracing the direction v of the sightline of the operator from the position C of the operator's eye reaches the vehicle V, i.e. whether the sightline of the operator is directed to the vehicle V (step ST5). In a case where the sightline of the operator is directed to the vehicle V, the action plan unit 43 executes step ST6. In a case where the sightline of the operator is not directed to the vehicle V, the action plan unit 43 executes step ST7. In the case where the sightline of the operator is directed to the vehicle V, it is presumed that the operator visually recognizes the vehicle V and monitors its periphery. That is, the operator monitoring unit 31 has a function of monitoring whether the operator monitors the periphery of the vehicle V.

In step ST7, the action plan unit 43 prohibits the movement of the vehicle V and obtains an elapsed time from the start of the timer (namely, an elapsed time from step ST4). In a case where the elapsed time is less than a first acceptance period (an example of a notification period), the action plan unit 43 executes step ST5 again. In a case where the elapsed time is equal to or more than the first acceptance period and less than a second acceptance period (an example of an acceptance period), the action plan unit 43 executes step ST8. In a case where the elapsed time is equal to or more than the second acceptance period, the action plan unit 43 executes step ST9. Each of the first and the second acceptance periods is a prescribed period, and the second acceptance period is longer than the first acceptance period. In the present embodiment, the first acceptance period is set to 5 seconds, and the second acceptance period is set to 10 seconds.

In step ST8, the action plan unit 43 sends a prescribed signal to the processing unit 33 to make the input/output unit 30 display an alert screen shown in FIG. 6B. The alert screen is a screen that urges the operator to monitor the vehicle V and check its periphery. When the action plan unit 43 completes sending the prescribed signal (namely, when the instruction to display the alert screen is completed), the action plan unit 43 executes step ST5.

In step ST9, in a case where the alert screen is displayed on the input/output unit 30 of the operation terminal 3, the action plan unit 43 makes the input/output unit 30 delete the alert screen and then display the input screen shown in FIG. 6A. Thereafter, the action plan unit 43 executes step ST1.

In step ST6, in a case where the alert screen is displayed on the input/output unit 30 of the operation terminal 3, the action plan unit 43 makes the input/output unit 30 delete the alert screen and then display the input screen. Next, the action plan unit 43 controls the traveling control unit 44 to move the vehicle V along the trajectory by the computed moving amount. Thereafter, the action plan unit 43 executes step ST10.

In step ST10, the action plan unit 43 resets the timer started in step ST4. When the reset of the timer is completed, the action plan unit 43 executes step ST11.

In step ST11, the action plan unit 43 determines whether the vehicle V has reached the parking position by comparing the current position of the vehicle V obtained by the GPS receiving unit 20 with the parking position. In a case where the vehicle V has reached the parking position, the action plan unit 43 executes step ST12. In a case where the vehicle V has not reached the parking position, the action plan unit 43 executes step ST1 again.

In step ST12, the action plan unit 43 executes the parking processing to stop the vehicle V at the parking position. When the parking processing is completed, the action plan unit 43 ends the remote parking processing and completes the parking assist processing.

Next, the operation of the vehicle control system 1 having the above configuration is described. When the remote parking processing is started, the action plan unit 43 determines whether the suspension button on the input screen is operated (step ST1). In a case where the suspension button is operated, the remote parking processing ends without moving the vehicle V.

In a case where the suspension button is not operated, the input of the operation amount by the operator is accepted on the input screen (step ST2). At this time, until the operator performs the input of the operation amount, the determination whether the suspension button is operated (step ST1) and the determination whether the input of the operation amount is performed (step ST2) are repeated.

When the operator performs the input of the operation amount on the input screen, the operation amount is converted into the moving amount (step ST3). Thereafter, the timer is started (step ST4), and the action plan unit 43 determines whether the sightline of the operator is directed to the vehicle V (step ST5).

In a case where the action plan unit 43 determines that the sightline of the operator is directed to the vehicle V and the alert screen is displayed on the operation terminal 3, the alert screen is switched to the input screen. Thereafter, the vehicle V moves along the trajectory by the computed moving amount (step ST6).

After the action plan unit 43 determines that the sightline of the operator is not directed to the vehicle V, in a case where the first acceptance period has not elapsed (step ST7), the action plan unit 43 again determines whether the sightline of the operator is directed to the vehicle V (step ST5). In a case where the action plan unit 43 determines that the sightline of the operator is directed to the vehicle V, the vehicle V moves by the computed moving amount (step ST6).

After the action plan unit 43 determines that the sightline of the operator is not directed to the vehicle V, in a case where the first acceptance period has elapsed from the reception of the operation input without the sightline of the operator directed to the vehicle V, the alert screen is displayed on the operation terminal 3 (step ST8). Thereafter, when the operator directs the sightline to the vehicle V within the second acceptance period from the reception of the operation input, the action plan unit 43 determines that the sightline of the operator is directed to the vehicle V (step ST5), and the vehicle V moves by the moving amount (step ST6).

In a case where the second acceptance period has elapsed from the reception of the operation input without the sightline of the operator directed to the vehicle V, the input screen is displayed on the operation terminal 3 without the movement of the vehicle V (step ST9). Thereafter, the input of the operation amount is accepted again (step ST1).

When the action plan unit 43 determines that the sightline of the operator is directed to the vehicle V and the vehicle V moves along the trajectory by the moving amount, the timer is reset (step ST10). Thereafter, the action plan unit 43 determines whether the vehicle V has reached the parking position (step ST11). When the vehicle V has reached the parking position, the action plan unit 43 executes the parking processing (step ST12) to end the remote parking processing. When the vehicle V has not reached the parking position, the action plan unit 43 executes the remote parking processing from step ST1, which is the first step thereof.

Next, the effect of the vehicle control system 1 having the above configuration is described. In the remote parking processing, in a case where the second acceptance period has elapsed from the reception of the operation input without the sightline of the operator directed to the vehicle V, the input screen is displayed on the operation terminal 3 without the movement of the vehicle V, so that the operation input is accepted again. That is, unless the operator directs the sightline to the vehicle V, the operation input is ignored and the vehicle V does not move. Thereby, it is possible to urge the operator to direct the sightline to the vehicle V and to monitor the vehicle V, so that the vehicle V can be moved to the parking position safely.

In a case where the operator directs the sightline to the vehicle V within the second acceptance period from the acceptance of the operation input, the vehicle V moves. Accordingly, even when the operator performs the operation input while watching the screen of the input/output unit 30 of the operation terminal 3, the operator can move the vehicle V by monitoring the vehicle V within the second acceptance period from the operation input. Thereby, the user does not need to monitor the vehicle V while performing the operation input, so that the vehicle control system 1 can be more convenient.

After the operator performs the operation input without monitoring the vehicle V, in a case where the first acceptance period has elapsed from the acceptance of the operation input without the sightline of the operator directed to the vehicle V, the alert screen is displayed on the input/output unit 30 of the operation terminal 3. Thereby, the operator can easily understand that the operator needs to monitor the vehicle V. Thereafter, when the operator starts to monitor the vehicle V according to the alert screen within the second acceptance period, the vehicle V moves. As described above, after the operator performs the operation input, in a case where the operator directs the sightline to the vehicle V within the second acceptance period, the operation input is not ignored and the vehicle V moves according to the operation input. Therefore, the vehicle control system 1 can be more convenient.

Second Embodiment

The vehicle control system 101 according to a second embodiment is different from the vehicle control system 1 according to the first embodiment only in step ST5 v of the remote parking processing executed by the action plan unit 43. The other steps of the remote parking processing in the second embodiment are the same as those in the first embodiment, and therefore the descriptions thereof are omitted.

Figure 8:
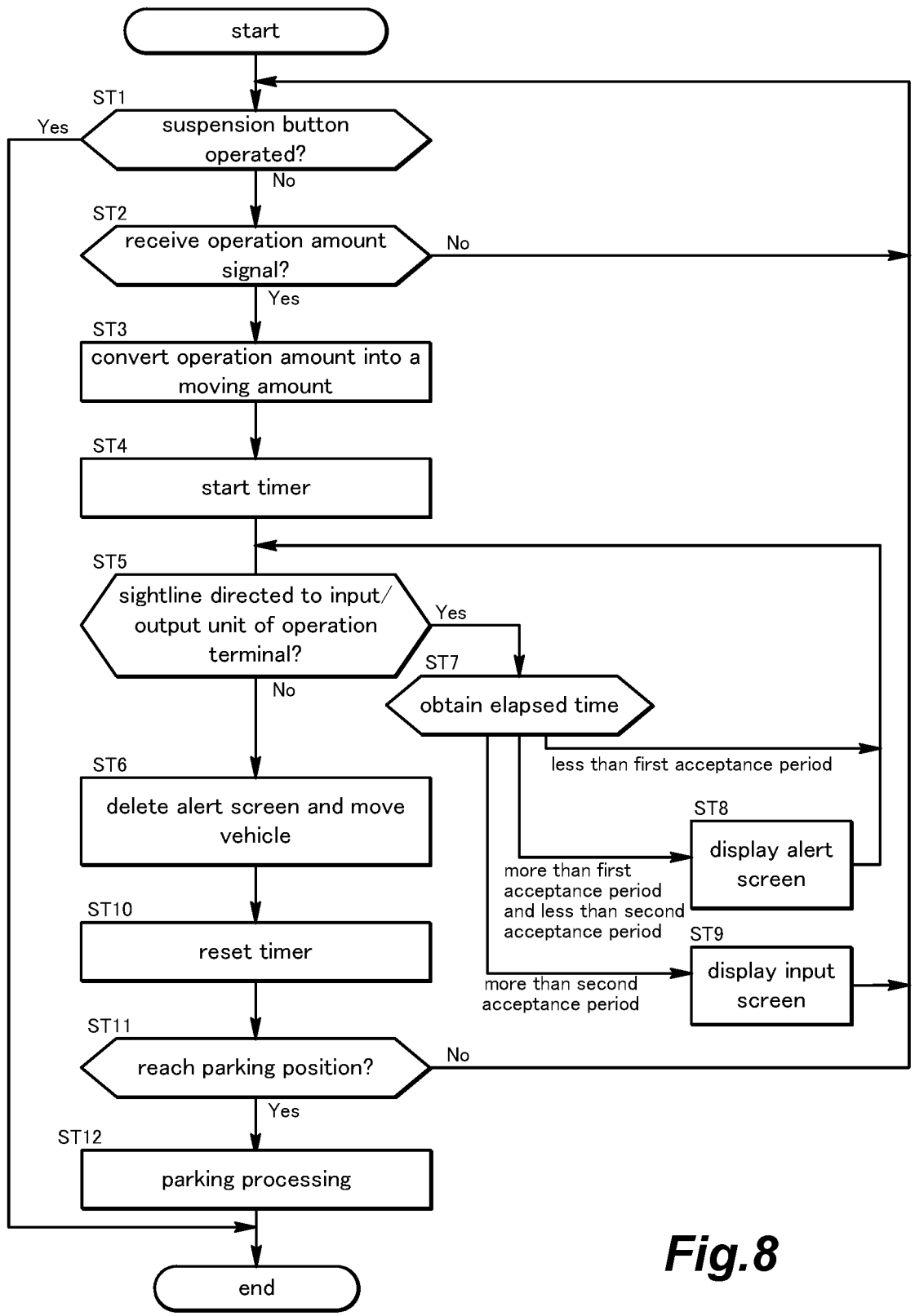
FIG. 8 is a flow chart of remote parking processing according to a second embodiment of the present invention.

As shown in FIG. 8, in step ST5 of the remote parking processing, similar to the first embodiment, the action plan unit 43 executes an image analysis of the user image to thereby obtain the direction of the sightline of the operator with respect to the screen of the input/output unit 30. Thereafter, the action plan unit 43 determines whether the sightline of the operator is directed to the input/output unit 30 of the operation terminal 3. In a case where the action plan unit 43 determines that the sightline of the operator is directed to the input/output unit 30, the action plan unit 43 executes step ST7. In a case where the action plan unit 43 determines that the sightline of the operator is not directed to the input/output unit 30, the action plan unit 43 executes step ST6.

Next, the effect of the vehicle control system 101 having the above configuration is described. In a case where the operator moves the vehicle V by performing the operation input to the operation terminal 3, the operator tends to watch the screen of the input/output unit 30. Therefore, in a case where the sightline of the operator is not directed to the screen of the input/output unit 30, it is presumed that the operator is monitoring the vehicle V.

The action plan unit 43 determines whether the direction of the sightline of the operator is directed to the screen of the input/output unit 30. In a case where the sightline of the operator is directed to the screen of the input/output unit 30, i.e. in a case where the operator watches the screen of the input/output unit 30 and does not monitor the vehicle V, the action plan unit 43 prohibits the movement of the vehicle V. As a result, it is possible to urge the operator not to watch the screen of the operation terminal 3 and to thereby make the operator monitor the vehicle V.

In a case where the sightline of the operator is not directed to the screen of the input/output unit 30, i.e. in a case where it is assumed that the operator is monitoring the vehicle V, the action plan unit 43 moves the vehicle V. As described above, in the second embodiment, the action plan unit 43 determines whether the operator is monitoring the vehicle V based on whether the sightline of the operator is directed to the screen of the input/output unit 30. Therefore, it is possible to simplify the processing to determine whether the operator is monitoring the vehicle V, compared with the first embodiment.

Third Embodiment

The vehicle control system 201 according to a third embodiment is different from the vehicle control system 1 according to the first embodiment in that the action plan unit 43 sequentially executes step ST21, step ST22, and step ST23 in the remote parking processing, instead of executing step ST5. The other steps of the remote parking processing in the third embodiment are the same as those in the first embodiment, and therefore the descriptions thereof are omitted.

Figure 9:
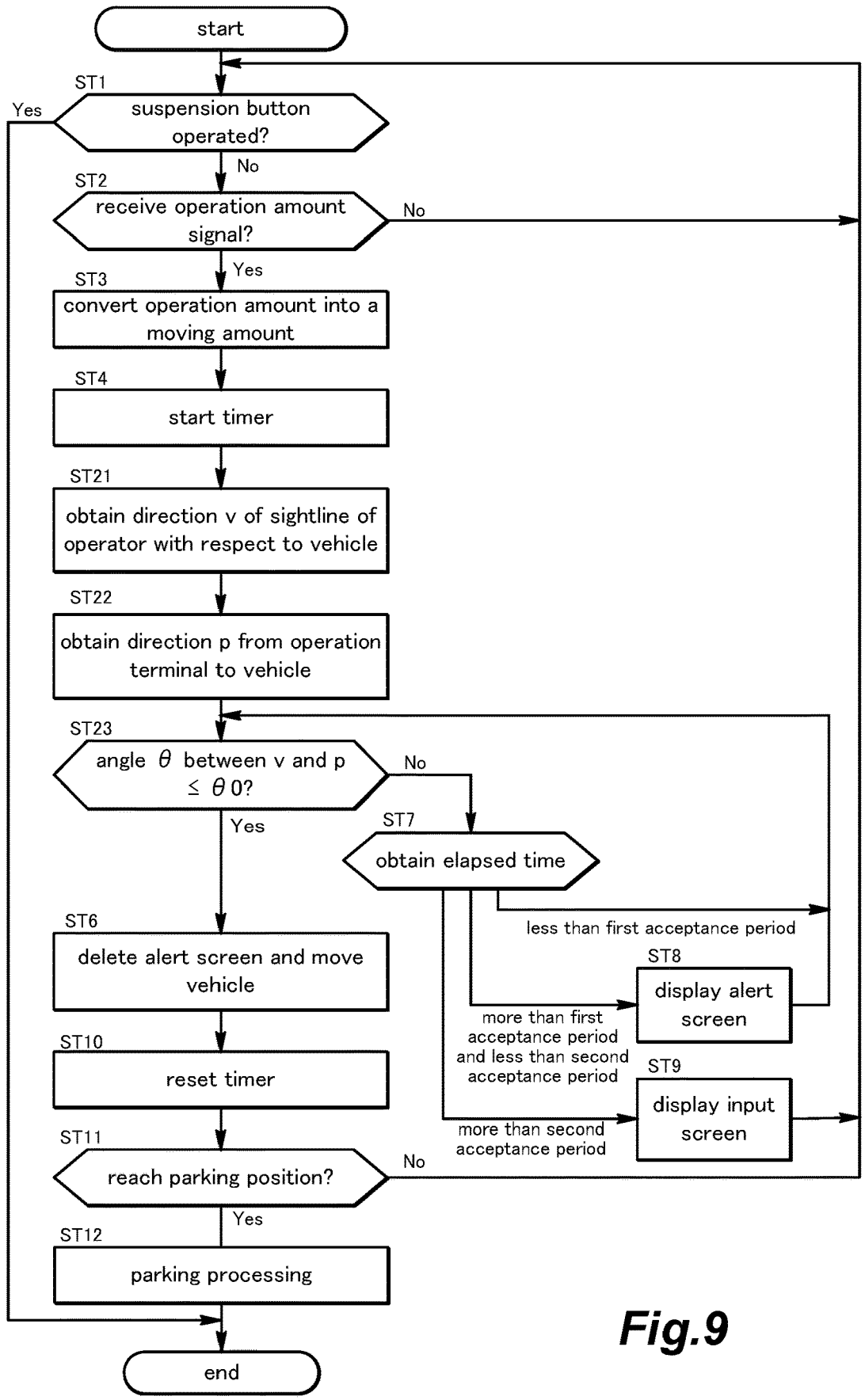
FIG. 9 is a flow chart of remote parking processing according to a third embodiment of the present invention.

As shown in FIG. 9, in step ST21 of the remote parking processing, similar to the first embodiment, the action plan unit 43 executes an image analysis of the user image to thereby obtain the direction of the sightline of the operator (user) with respect to the screen of the input/output unit 30. Thereafter, the action plan unit 43 instructs the processing unit 33 to send the posture of the operation terminal 3 obtained by the terminal posture detection unit 50, and thereby obtains the posture of the operation terminal 3. Thereafter the action plan unit 43 obtains the direction v (see FIG. 10) of the sightline of the operator (user) with respect to the vehicle V based on the posture of the operation terminal 3. The action plan unit 43 executes step ST22 after obtaining the direction v of the sightline of the operator with respect to the vehicle V.

In step ST22, the action plan unit 43 instructs the processing unit 33 to make the position detection unit 32 (first position identifying unit) obtain the position of the operation terminal 3. Thereafter, the action plan unit 43 instructs the processing unit 33 to send the position of the operation terminal 3, and thereby obtains the position of the operation terminal 3. Thereafter, the action plan unit 43 obtains the position of the vehicle V identified by the vehicle position identifying unit 42 (second position identifying unit) based on the signal from the GPS receiving unit 20 of the navigation device 10. Thereafter, the action plan unit 43 computes (obtains) a direction p (vector p) directed from the position of the operation terminal 3 to the position of the vehicle V by computing the difference between these two positions. Thereafter, the action plan unit 43 executes Step ST23.

In step ST23, the action plan unit 43 computes an angle θ between the direction v and the direction p, and determines whether the angle θ is equal to or less than a prescribed value θ0. In a case where the angle θ is equal to or less than the prescribed value θ0, the action plan unit 43 determines that the sightline of the operator is directed to the vehicle V, and thereby executes step ST6. In a case where the angle θ is more than the prescribed value θ0, the action plan unit 43 determines that the sightline of the operator is not directed to the vehicle V, and thereby executes step ST7. The prescribed value θ0 may be determined based on the size of the vehicle V viewed from the operator or may be determined based on the distance between the operator and the vehicle V and the size of the vehicle V.

Next, the effect of the vehicle control system 201 according to the third embodiment is described. In the third embodiment, the action plan unit 43 obtains the direction v of the sightline of the operator based on the user image. Thereafter, the action plan unit 43 obtains the position of the operation terminal 3 and the position of the vehicle V, and thereby computes the direction p from the position of the operation terminal 3 to the position of the vehicle V.

Figure 10:
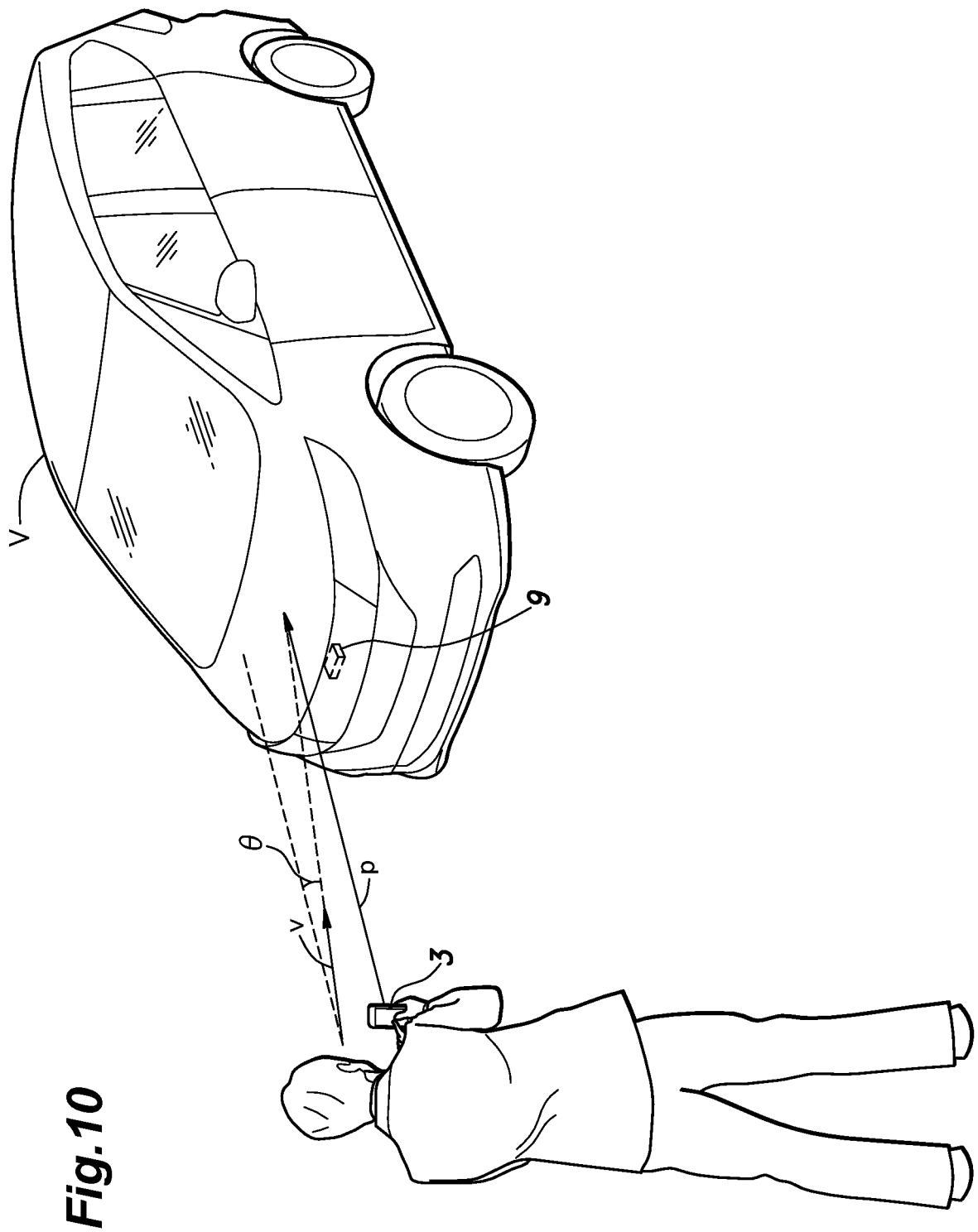
FIG. 10 is an explanatory diagram for explaining a method to obtain a direction of a sightline of an operator.

When the user controls the vehicle V by using the operation terminal 3, the user may monitor the vehicle V while directing the sightline to the screen of the input/output unit 30 to perform the operation input thereon. As shown in FIG. 10, the operator may place the operation terminal 3 between the operator's eye and the vehicle V so that the operator can perform the operation input to the operation terminal 3 while simultaneously monitoring the vehicle V. In a case where the operator places the operation terminal 3 between the operator's eye and the vehicle V, the direction v of the sightline of the operator and the direction p directed from the position of the operation terminal 3 to the position of the vehicle V become substantially parallel with each other. Therefore, the action plan unit 43 can determine whether the user is monitoring the vehicle V by determining whether the angle θ between the direction v and the direction p is equal to or less than the prescribed value θ0. Accordingly, it is possible for the action plan unit 43 to determine whether the operator is monitoring the vehicle V without information about the position of the operation terminal 3 with respect to the vehicle V. Therefore, it is possible for the action plan unit 43 to determine whether the sightline of the operator is directed to the vehicle V by using a simpler configuration, compared with the first embodiment.

Concrete embodiments of the present invention have been described in the foregoing, but the present invention should not be limited by the foregoing embodiments and various modifications and alterations are possible within the scope of the present invention. In the first embodiment, the processing unit 33 obtains the distance between the operation terminal 3 and the communication device 9 and the direction of the operation terminal 3 viewed from the communication device 9 by communicating with the communication device 9 by using Bluetooth. However, the present invention is not limited to this embodiment. For example, the processing unit 33 may obtain the position and image of the operator by using the external cameras 18, the millimeter wave radar, and the laser lidar, and may compute the direction of the sightline of the operator based on the position and image of the operator obtained thereby.

The invention claimed is:

1. A vehicle control system, comprising:
a terminal including an input/output unit configured to accept an operation input by a user and to display a notification to the user and an operator monitoring unit configured to monitor the user performing the operation input; and
a control device configured to perform remote parking processing to move and park a vehicle in response to the operation input by the user,
wherein, in the remote parking processing, the control device is configured to obtain a direction of a sightline of the user based on information obtained by the operator monitoring unit, and prohibit a movement of the vehicle in a case where the control device determines that the sightline of the user is directed to the terminal,
wherein, in the remote parking processing, the control device is configured to
prohibit the movement of the vehicle in the case where the control device determines that the sightline of the user is directed to the terminal when the operation input is accepted, and
permit the movement of the vehicle in a case where the control device determines that the sightline of the user is directed to the vehicle within a prescribed acceptance period after the operation input is accepted, and
wherein, in the remote parking processing, the control device is configured to make the input/output unit display a notification that urges the user to direct the sightline to the vehicle in a case where the control device does not determine that the sightline of the user is directed to the vehicle within a prescribed notification period shorter than the acceptance period after the operation input is accepted.

2. The vehicle control system according to claim 1, wherein, in the remote parking processing, the control device is configured to determine that the sightline of the user is directed to the vehicle in a case where the sightline of the user is not directed to the terminal.

3. The vehicle control system according to claim 1, wherein the operator monitoring unit is configured to capture an image of a face of the user performing the operation input, and
the control device is configured to obtain the direction of the sightline of the user based on the image captured by the operator monitoring unit.

4. The vehicle control system according to claim 1, wherein the operator monitoring unit is configured to capture an image of a face of the user performing the operation input,
the terminal includes a first position identifying unit configured to identify a position of the terminal and the control device includes a second position identifying unit configured to identify a position of the vehicle, and
the control device is configured to
obtain the direction of the sightline of the user based on the image captured by the operator monitoring unit,
obtain a direction from the terminal to the vehicle based on the position of the terminal and the position of the vehicle, and
determine that the sightline of the user is directed to the vehicle in a case where an angle between the direction of the sightline of the user and the direction from the terminal to the vehicle is equal to or less than a prescribed value.

5. A vehicle control system, comprising:
a terminal including an input/output unit configured to accept an operation input by a user and to display a notification to the user and an operator monitoring unit configured to monitor the user performing the operation input; and a control device configured to perform remote parking processing to move and park a vehicle in response to the operation input by the user, wherein, in the remote parking processing, the control device is configured to obtain a direction of a sightline of the user based on information obtained by the operator monitoring unit, and prohibit a movement of the vehicle in a case where the control device determines that the sightline of the user is not directed to the vehicle, wherein, in the remote parking processing, the control device is configured to prohibit the movement of the vehicle in the case where the control device determines that the sightline of the user is directed to the terminal when the operation input is accepted, and permit the movement of the vehicle in a case where the control device determines that the sightline of the user is directed to the vehicle within a prescribed acceptance period after the operation input is accepted, and wherein, in the remote parking processing, the control device is configured to make the input/output unit display a notification that urges the user to direct the sightline to the vehicle in a case where the control device does not determine that the sightline of the user is directed to the vehicle within a prescribed notification period shorter than the acceptance period after the operation input is accepted.

* * * * *